Figure 1:
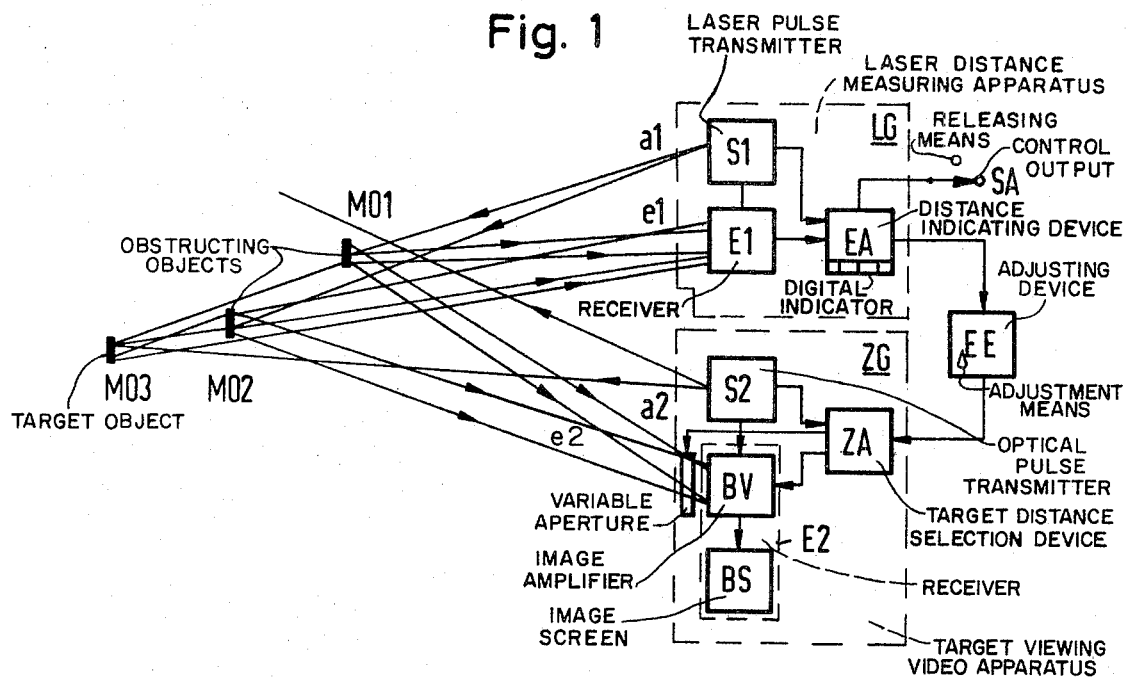

United States Patent [19]
Dall'Armi

[11] 3,848,999
[45] Nov. 19, 1974

[54] OPTICAL RANGE MEASURING APPARATUS

[75] Inventor: Georg V. Dall'Armi, Unterhaching, Germany

[73] Assignee: Siemens Aktiengesellschaft, Berlin and Munich, Germany

[22] Filed: Oct. 26, 1971

[21] Appl. No.: 192,143

[30] Foreign Application Priority Data
Oct. 29, 1970 Germany.......................... 2053111

[52] U.S. Cl........................................ 356/4, 356/5
[51] Int. Cl................................................ G01c 3/08
[58] Field of Search.................. 356/4, 5; 343/6 ND

[56] References Cited
UNITED STATES PATENTS

| | | | |
|---|---|---|---|
| 3,305,633 | 2/1967 | Chernoch | 356/5 |
| 3,380,358 | 4/1968 | Neumann | 356/5 |
| 3,409,368 | 11/1968 | Fernandez | 356/5 |
| 3,463,588 | 8/1969 | Meyerand, Jr. et al. | 356/5 |

Primary Examiner—Maynard R. Wilbur
Assistant Examiner—S. C. Buczinski
Attorney, Agent, or Firm—Herbert L. Lerner

[57] ABSTRACT

Laser distance measuring apparatus has a first laser pulse transmitter, a first receiver connected to the first transmitter and a distance indicating device connected to the first transmitter and the first receiver for determining and measuring the distance of at least one measuring object. Target-viewing video apparatus has a second optical pulse transmitter aligned with the measuring objects, a second receiver having an image amplifier connected to the second transmitter and an image screen connected to the image amplifier and a target distance selection device connected to the second transmitter and the image amplifier of the second receiver for opening the second receiver after the elapse of an adjustable period of time after each pulse of the second pulse transmitter is transmitted. An adjusting device connected between the distance indicating device of the laser distance measuring apparatus and the target distance selection device of the target-viewing video apparatus selectively adjusts the target distance selection device to the distance of one of the measuring objects measured by the laser distance measuring apparatus.

17 Claims, 2 Drawing Figures

OPTICAL RANGE MEASURING APPARATUS

The invention relates to optical range measuring apparatus.

There are known optical range or distance finding measuring apparatus wherein light pulses are transmitted by a laser. The pulses are then received by a receiver after reflection at one or more measuring objects located in the beam path. The distances of the individual measuring objects are determined by the transit time of the individual reflected pulses between the laser and the receiver. It cannot be decided however, which ranges or distances pertain to the sought target and which pertain to obstructing measuring objects.

A night viewing device is produced by Laser Diode Laboratories of the United States. This device illuminates the target by pulses, with the assistance of a gallium arsenide laser diode, making it visible on a screen via image amplifier video apparatus. In order to eliminate reflection sources located in front of the target, the receiver input is opened only during the period during which a pulse, which is reflected in the approximate distance of the target, may return to the receiver. This is called the "range-gating" and "gated-viewing" method.

It is an object of the invention to provide optical range measuring apparatus which can be used firstly, to determine, within a selected measuring range or distance, the distance of all measuring objects on which at least one issued light pulse impinges and, secondly, which makes it possible to decide which of the measuring objects is the sought target.

Another object of the invention is to provide optical range measuring apparatus which functions with efficiency, effectiveness and reliability.

In accordance with the invention, in optical range or distance measuring apparatus a known laser distance measuring device is provided with a first transmitter pulse which includes a laser, a first receiver and distance or range measuring or finding apparatus which is used to determine and indicate the distance or range of at least one acquired measured object, an active target viewing video apparatus comprising a second optical pulse transmitter, a second receiver comprising an image amplifier and screen and a target distance selection device which opens the second receiver after a respective adjustable period following the transmission of each pulse of the second optical pulse transmitter, which is the range-gating and gated-viewing method, and an adjusting device which adjusts the target distance selection device, as desired, to one of the measured objects distances established by the laser distance measuring apparatus.

It is preferable for the practical execution of the apparatus of the invention to also provide a laser as a second optical pulse transmitter. It is also expedient to provide a single laser pulse transmitter which serves during a first stage or condition of operation as a first pulse transmitter and during a second stage or condition of operation as a second pulse transmitter. It is preferable that during a condition of operation, an optical frequency converter is provided in the beam path of the laser.

In another preferred embodiment of the invention, the apparatus includes a laser pulse transmitter whose pulses are processed by the receiver of the distance measuring apparatus and the receiver of the target-viewing video apparatus. A beam divider is preferably provided in the beam path of the laser pulse transmitter and an optical frequency converter is provided in the beam path of a component beam. The frequency conversion may be shown as in U.S. Pat. No. 3,309,526; U.S. Pat. No. 3,328,723 and U.S. Pat. No. 3,465,166.

In another preferred embodiment of the invention, a laser pulse transmitter simultaneously transmits pulses of two different wavelengths.

It is preferable that the first pulse transmitter transmits infrared optical waves of 1.06 microns wavelength and the second pulse transmitter transmits green optical waves of 0.53 micron wavelength, or if the laser pulse transmitter which transmits two wavelengths operates on these wavelengths.

To put the idea of the invention into practical operation, I have found it expedient to provide a distance indicating device which produces a digital indication of the distance of the measuring objects, and to provide switches in the adjusting device for the individual digital indicating fields whereby the target distance selection device is adjusted to one of the measuring object distances when the switches are operated. If the target and/or the apparatus of the invention is locally shiftable, it is of particular advantage to provide an automatic follow-up of the target distance selection device.

For simultaneous viewing of measuring objects located at various distances, it is preferable to use target-viewing video apparatus having several screens.

It is of particular advantage to provide the active target-viewing video apparatus as a day and night viewing device.

A preferred embodiment of the invention provides target-viewing video apparatus having a receiver whose aperture angle is variable. It is preferable to change the aperture angle automatically, in dependence on the measuring object distance.

The apparatus of the invention may be utilized on land, air and water craft.

Figure 2:
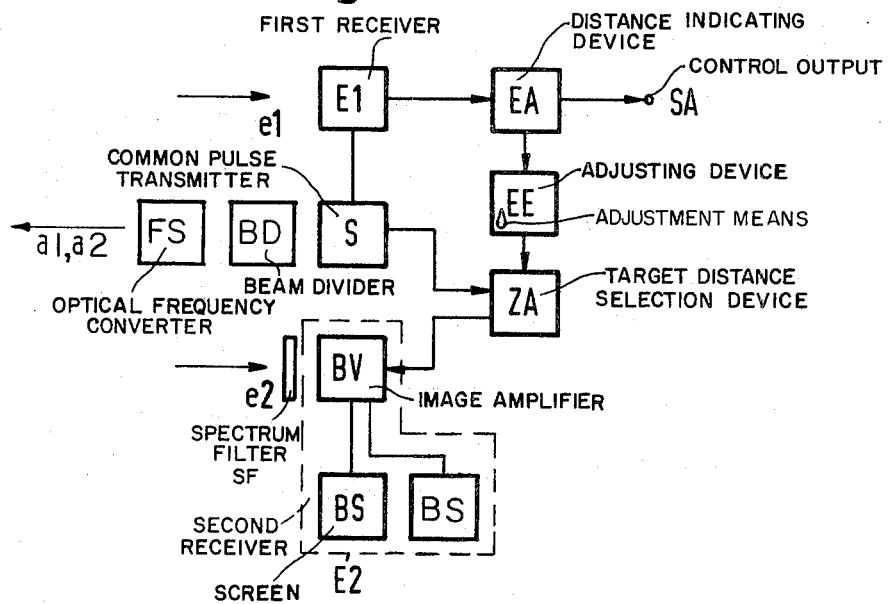

In order that the invention may be readily carried into effect, it will now be described with reference to the accompanying drawing, wherein:

FIG. 1 is a block diagram of an embodiment of the optical range measuring apparatus of the invention; and FIG. 2 is a block diagram of another embodiment of the optical range measuring apparatus of the invention.

In FIG. 1, the apparatus comprises laser distance measuring apparatus LG, target-viewing video apparatus ZG and an adjusting device EE.

The laser distance measuring apparatus LG comprises a laser pulse transmitter S1 having an optical output $a1$, receiver E1 having an optical input $e1$ and a distance indicating device EA having a control output SA.

The target-viewing video apparatus ZG comprises a laser pulse transmitter S2 having an optical output $a2$, a receiver E2 having an image amplifier BV and an optical input $e2$, a screen BS and a target distance selection device ZA.

FIG. 1 shows three measuring objects MO1, MO2 and MO3. The measuring object MO3 is the target object and the measuring objects MO1 and MO2 are the obstructing objects.

The optical range measuring apparatus of FIG. 1 operates as follows. The laser pulse transmitter S1 transmits, at its optical output a1, sharply bunched pulses which impinge upon the measuring objects MO1, MO2 and MO3. The pulses are reflected at all three measuring objects MO1, MO2 and MO3 and arrive, via the optical input e1, at the receiver E1. The distance indicating device EA establishes the transit time of the pulses reflected at the various measuring objects between the transmitter and the receiver and indicates the respective distances.

The optical pulse transmitter S2 irradiates the three measuring objects MO1, MO2 and MO3 via the optical output a2, with pulses having a sequence frequency of 25 Hz and a pulse duration of approximately 15 nanoseconds. The pulses are reflected at the measuring objects MO1, MO2 and MO3 and reach the optical input e2 of the image amplifier BV preferably through a spectrum filter SF of the receiver E2. The target distance selection device ZA determines the opening time of the optical input e2 with respect to its duration and its start, following the transmission of the pulse, by the laser pulse transmitter S2. The opening time of the optical input e2 may be so established, for example, that only pulses which are reflected by measuring objects at a distance of about 1,000 meters reach the image amplifier BV.

In the illustrated example, the distances between the optical range measuring apparatus and the measuring objects MO1, MO2 and MO3 may be, for example, 900 meters, 1,000 meters and 1,050 meters. These distances are indicated by the distance indicating device EA. The operating personnel do not know, however, which of the three distances is that of the target object MO3. For this reason, the distance indicating device EA which may have a digital indicator feeds the three distance magnitudes into the target distance selection device ZA, in sequence, and the operating personnel view the three measuring objects MO1, MO2 and MO3, in sequence, on the image screen BS. The operating personnel decide which of the three images indicates the target, and they read the appertaining distance at the distance indicating device EA. Information concerning the target distance may be derived from the control output SA and processed in another device. Such information may selectively be connected to the control output SA through a simple switch (not shown), hereinafter referred to as "releasing means."

If, after the measurement of the distance of the target MO3 by the target-viewing video apparatus ZG, the location of the target, is changed, for example, then the target-viewing video apparatus ZG can be adjusted or "pulled-along" by the distance indicating device EA and the adjusting device EE, in such a manner that the target MO3 remains on the screen BS and the respective distance is continuously indicated at the control output SA. The adjusting device EE has range selection switches.

When used in bright surroundings, such as daylight or during a full moon, a spectrum filter SF installed in front of the optical input e2 is provided to insure that only light in the wavelength range of the laser pulse transmitter S1, reaches the image amplifier BV.

Although the image screen BS is represented as a single viewing device in FIG. 1, it may be preferable to use two or more screens in order that several targets may be viewed simultaneously.

The pulses transmitted by the laser pulse transmitter S2 can either detect the entire measuring object with a relative large aperture angular spread or may detect only a small part thereof. It is preferable to change the aperture angle automatically as a function of the measuring object distance.

FIG. 2 shows another embodiment of the optical range measuring apparatus of the invention. The embodiment of FIG. 1 differs from the embodiment of FIG. 1 due to the fact that the pulse transmitters S1 and S2 of the embodiment of FIG. 1 are joined into a common pulse transmitter S in the embodiment of FIG. 2. The radiated beam of the common pulse transmitter S is reflected back to the first receiver E1 and to the second receiver E2.

The common pulse transmitter S may be sequentially operated in two alternate conditions. In a first of these conditions the output from transmitter S may be radiated directly toward the target and the measured objects. In a second condition the output from transmitter S may be radiated in the direction of the measured objects and the target through an optical frequency converter FS. The two conditions may be effected simultaneously with the use of a common optical beam divider BD for splitting the output of transmitter S into two spatially separated beams. One of the two spatially separated beams may be directly utilized to illuminate the measuring objects and the target, while the other beam may be projected to the target and measuring objects through the optical frequency converter.

While the invention has been described by means of specific examples and in specific embodiments. I do not wish to be limited thereto, for obvious modifications will occur to those skilled in the art without departing from the spirit and scope of the invention.

I claim:

1. Optical range measuring apparatus for one of a plurality of measuring objects including a target measuring object, comprising laser distance measuring apparatus (LG) having a first laser pulse transmitter (S1), a first receiver (E1) connected to the first transmitter and a distance indicating device (EA) connected to the first transmitter and the first receiver for determining and measuring the distance of at least one measuring object; target-viewing video apparatus (ZG) having a second optical pulse transmitter (S2) aligned with the measuring objects, a second receiver (E2) having an image amplifier (BV) connected to the second transmitter and an image screen (BS) connected to the image amplifier and a target distance selection device (ZA) connected to the second transmitter and the image amplifier of the second receiver for opening the second receiver after the elapse of an adjustable period of time after each pulse of the second pulse transmitter is transmitted; and an adjusting device (EE) connected between the distance indicating device of the laser distance measuring apparatus and the target distance selection device of the target-viewing video aparatus for selectively adjusting said target distance selection device to the distance of one of the measuring objects measured by the laser distance measuring apparatus.

2. Optical range measuring apparatus as claimed in claim 1, wherein the second optical pulse transmitter comprises a laser.

3. Optical range measuring apparatus as claimed in claim 1, wherein the first laser pulse transmitter transmits optical waves of 1.06 microns wavelength and the second pulse transmitter transmits optical waves of 0.53 micron wavelength.

4. Optical range measuring apparatus as claimed in claim 1, wherein the distance indicating device provides a digital indication of the distances of the measuring objects, the adjusting device includes switches for individual digital indicating fields, and the operation of the switches of the adjusting device adjusts the target distance selection device to the distance of one of the measuring objects.

5. Optical range measuring apparatus as claimed in claim 1, wherein the target distance selection device is adjusted to correspond to the target distance when the relative distance between the target measuring object and the distance measuring apparatus and the relative distance between the target measuring object and the target-viewing video apparatus varies.

6. Optical range measuring apparatus as claimed in claim 1, further comprising releasing means connected to the distance indicating device for causing the distance indicating device to transmit information regarding the distance of the target measuring object to control other apparatus when said releasing means is operated.

7. Optical range measuring apparatus as claimed in claim 1, wherein the second receiver of the target-viewing video apparatus has a plurality of image screens for simultaneously indicating a plurality of measuring objects at different distances.

8. Optical range measuring apparatus as claimed in claim 1, wherein the target-viewing video apparatus operates in daylight and in the dark.

9. Optical range measuring apparatus as claimed in claim 1, wherein the second receiver of the target-viewing video apparatus has a variable aperture angle.

10. Optical range measuring apparatus as claimed in claim 1, wherein the second receiver of the target-viewing video apparatus has an aperture and means for varying the aperture angle in dependence upon the distance of the measuring object.

11. Optical range measuring apparatus as claimed in claim 1, further comprising an spectrum filter in front of the optical input ($e2$) of the image amplifier of the second receiver of the target-viewing video apparatus, said optical filter passing only wavelengths from the second pulse transmitter.

12. Optical range measuring apparatus for one of a plurality of measuring objects including a target measuring object, comprising laser distance measuring apparatus (LG) having a first laser pulse transmitter (S1), a first receiver (E1) connected to the first transmitter and a distance indicating device (EA) connected to the first transmitter and the first receiver for determining and measuring the distance of at least one measuring object; target-viewing video apparatus (ZG) having a common pulse transmitter (S), a second optical pulse transmitter (S2) aligned with the measuring objects, the first laser pulse transmitter and the second pulse transmitter being combined in the common pulse transmitter which in a first condition of operation functions as the first pulse transmitter and in a subsequent condition of operation functions as the second pulse transmitter, a second receiver (E2) having an image amplifier (BV) connected to the second transmitter and an image screen (BS) connected to the image amplifier and a target distance selection device (ZA) connected to the second transmitter and the image amplifier of the second receiver for opening the second receiver after the elapse of an adjustable period of time after each pulse of the second pulse transmitter is transmitted; and an adjusting device (EE) connected between the distance indicating device of the laser distance measuring apparatus and the target distance selection device of the target-viewing video apparatus for selectively adjusting said target distance selection device to the distance of one of the measuring objects measured by the laser distance measuring apparatus.

13. Optical range measuring apparatus as claimed in claim 12, further comprising an optical frequency converter in the radiation path of the common pulse transmitter in one condition of operation of said common pulse transmitter.

14. Optical range measuring apparatus for one of a plurality of measuring objects including a target measuring object, comprising laser distance measuring apparatus (LG) having a first laser pulse transmitter (S1), a first receiver (E1) connected to the first transmitter and a distance indicating device (EA) connected to the first transmitter and the first receiver for determining and measuring the distance of at least one measuring object; target-viewing video apparatus (ZG) having a common pulse transmitter (S), a second optical pulse transmitter (S2) aligned with the measuring objects, a second receiver (E2) having an image amplifier (BV) connected to the second transmitter and an image screen (BS) connected to the image amplifier and a target distance selection device (ZA) connected to the second transmitter and the image amplifier of the second receiver for opening the second receiver after the elapse of an adjustable period of time after each pulse of the second pulse transmitter is transmitted, the first laser pulse transmitter and the second pulse transmitter being combined in the common pulse transmitter and transmitting pulses which are reflected by the measuring objects to the first receiver of the laser distance measuring apparatus and the second receiver of the target-viewing video apparatus; and an adjusting device (EE) connected between the distance indicating device of the laser distance measuring apparatus and the target distance selection device of the target-viewing video apparatus for selectively adjusting said target distance selection device to the distance of one of the measuring objects measured by the laser distance measuring apparatus.

15. Optical range measuring apparatus as claimed in claim 14, further comprising a beam divider in the radiation path of the common pulse transmitter and an optical frequency converter in the radiation path of a component beam of the beam divider.

16. Optical range measuring apparatus as claimed in claim 14, wherein the common pulse transmitter simultaneously produces pulses of two different wavelengths.

17. Optical range measuring apparatus as claimed in claim 14, wherein the common pulse transmitter transmits optical waves of 1.06 microns wavelength and 0.53 micron wavelength.

* * * * *